(12) United States Patent
Li et al.

(10) Patent No.: US 12,335,837 B2
(45) Date of Patent: Jun. 17, 2025

(54) DATA TRANSMISSION METHOD, COMMUNICATION DEVICE, AND CHIP

(71) Applicant: GUANGDONG OPPO MOBILE TELECOMMUNICATIONS CORP., LTD., Dongguan (CN)

(72) Inventors: Haitao Li, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 347 days.

(21) Appl. No.: 17/951,803

(22) Filed: Sep. 23, 2022

(65) Prior Publication Data

US 2023/0014211 A1   Jan. 19, 2023

Related U.S. Application Data

(63) Continuation of application No. PCT/CN2020/080835, filed on Mar. 24, 2020.

(51) Int. Cl.
*H04W 40/02* (2009.01)
*H04W 48/20* (2009.01)
*H04W 76/27* (2018.01)

(52) U.S. Cl.
CPC ........... *H04W 40/02* (2013.01); *H04W 48/20* (2013.01); *H04W 76/27* (2018.02)

(58) Field of Classification Search
CPC ...... H04W 40/02; H04W 76/27; H04W 48/20
See application file for complete search history.

(56) References Cited

U.S. PATENT DOCUMENTS 11,284,346 B2 * 3/2022 Xu .................... H04W 28/0278
11,477,715 B2 * 10/2022 Liu ........................ H04L 1/1825
(Continued)

FOREIGN PATENT DOCUMENTS

CN        107645779 A        1/2018
CN        109644338 A        4/2019
(Continued)

OTHER PUBLICATIONS

The First Office Action from corresponding Chinese Application No. 202211496620X dated May 18, 2024. English translation attached.
(Continued)

*Primary Examiner* — Chandrahas B Patel
(74) *Attorney, Agent, or Firm* — Sheppard, Mullin, Richter & Hampton LLP

(57) ABSTRACT

Provided is a data transmission method, including: receiving, by a target base station, a RRC resume request message and first data that are transmitted by a terminal device; transmitting, by the target base station, a retrieve terminal context request message to an anchor base station, the retrieve terminal context request message carrying the first data or first indication information indicating transmission of the first data; and receiving, by the target base station, a reply message transmitted by the anchor base station, the reply message carrying second indication information indicating whether the anchor base station is capable of transmitting the first data to a core network. The first data is transmitted to the core network by the target base station in response to the second indication information indicating that the anchor base station is incapable of transmitting the first data to the core network.

7 Claims, 7 Drawing Sheets

(56) References Cited

U.S. PATENT DOCUMENTS

| | | |
|---|---|---|
| 2018/0220486 A1 | 8/2018 | Tseng et al. |
| 2018/0270894 A1 | 9/2018 | Park et al. |
| 2019/0230731 A1 | 7/2019 | Park et al. |
| 2020/0037210 A1 | 1/2020 | Rugeland et al. |
| 2021/0274393 A1* | 9/2021 | Zhou .................. H04W 36/0033 |
| 2022/0015007 A1* | 1/2022 | Han ........................ H04W 8/14 |

FOREIGN PATENT DOCUMENTS

| | | |
|---|---|---|
| CN | 109699050 A | 4/2019 |
| CN | 110035497 A | 7/2019 |
| CN | 110169154 A | 8/2019 |
| CN | 110636565 A | 12/2019 |
| EP | 3979763 A1 | 4/2022 |

OTHER PUBLICATIONS

Huawei et al "Update of Solution 4.7: Infrequent small user data transfer" 3GPP TSG SA WG2 Meeting #116 S2-163546, Jul. 5, 2016-, full text.

Ericsson et al."Security solution for small data fast path in SA2 TR 23.887",3GPP TSG SA WG3 (Security) Meeting #70,S3-130152,Jan. 14, 2013, full text.

International Search Report and Written Opinion dated Dec. 17, 2020 in International Application No. PCT/CN2020/080835. English translation attached.

Extended European Search Report dated Feb. 22, 2023 received in European Patent Application No. EP20927923.1.

Interdigital Communications et al :"On Small Data transmission without Path Switch(R3-190039/82-1813394)",3GPP Draft; R3-190367 Clot Resume Withoutchanging Anchor_V2 ,3rd Generation Partnership Project (3GPP) , Mobile, Competence Centre ; 650, Route Des Lucioles ; F-06921 Sophia-Antipolis Cedex; France, vol. RAN WG3, No. Athens, Greece;Feb. 25-Mar. 1, 2019, Feb. 14, 2019 (Feb. 14, 2019) ,XP051 604308.

Huawei :"RAN3 inputs for RAN2 eMTcrunning CR"3GPP Draft; R3--200179,3rd Generationpartnership Project(3GPP), Mobilecompetence Centre ; 650, Route Des Lucioles; F-06921 Sophia-Antipolis Cedex; France, vol. RANWG3,No. E-Meeting;Feb. 24-Mar. 6, 2020 Feb. 14, 2020(Feb. 14, 2020) ,XP051853928.

* cited by examiner

DATA TRANSMISSION METHOD, COMMUNICATION DEVICE, AND CHIP

CROSS-REFERENCE TO RELATED APPLICATIONS

The present application is a continuation of International Application No. PCT/CN2020/080835, filed on Mar. 24, 2020, the entire disclosure of which is incorporated herein by reference.

TECHNICAL FIELD

Embodiments of the present disclosure relate to the field of mobile communication technologies, and more particularly, to a data transmission method and apparatus, and a communication device.

BACKGROUND

In order for a terminal device in an inactive state to transmit data, it is necessary to restore a Radio Resource Control (RRC) connection to enter a connected state before transmitting the data. To enable data transmission by the terminal device in the inactive state, the data transmission can be performed via a user plane before the terminal device enters the connected state. However, in a case of data transmission via the user plane, when a target base station to which the terminal device initiates an RRC connection resume process is not an anchor base station, it needs to be clarified how the data transmitted by the terminal device is delivered to a core network.

SUMMARY

Embodiments of the present disclosure provide a data transmission method and apparatus, and a communication device.

According to an embodiment of the present disclosure, a data transmission method includes: receiving, by a target base station, an RRC resume request message and first data that are transmitted by a terminal device; transmitting, by the target base station, a retrieve terminal context request message to an anchor base station, the retrieve terminal context request message carrying the first data or first indication information indicating transmission of the first data; and receiving, by the target base station, a reply message transmitted by the anchor base station, the reply message carrying second indication information indicating whether the anchor base station is capable of transmitting the first data to a core network. The first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

According to an embodiment of the present disclosure, a data transmission method includes: receiving, by an anchor base station, a retrieve terminal context request message transmitted by a target base station, the retrieve terminal context request message carrying first data or first indication information indicating transmission of the first data; and transmitting, by the anchor base station, a reply message to the target base station, the reply message carrying second indication information indicating whether the anchor base station is capable of transmitting the first data to a core network. The first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

According to an embodiment of the present disclosure, a data transmission apparatus is applied in a target base station. The apparatus includes: a receiving unit configured to receive an RRC resume request message and first data that are transmitted by a terminal device; and a transmitting unit configured to transmit a retrieve terminal context request message to an anchor base station, the retrieve terminal context request message carrying the first data or first indication information indicating transmission of the first data. The receiving unit is further configured to receive a reply message transmitted by the anchor base station, the reply message carrying second indication information indicating whether the anchor base station is capable of transmitting the first data to a core network. The first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

According to an embodiment of the present disclosure, a data transmission apparatus is applied in an anchor base station. The apparatus includes: a receiving unit configured to receive a retrieve terminal context request message transmitted by a target base station, the retrieve terminal context request message carrying first data or first indication information indicating transmission of the first data; and a transmitting unit configured to transmit a reply message to the target base station, the reply message carrying second indication information indicating whether the anchor base station is capable of transmitting the first data to a core network. The first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

According to an embodiment of the present disclosure, a communication device includes: a processor; and a memory for storing a computer program. The processor is configured to invoke and execute the computer program stored in the memory to perform the data transmission method as described above.

According to an embodiment of the present disclosure, a chip is configured to implement the data transmission method as described above.

Specifically, the chip includes a processor configured to invoke and execute a computer program from a memory to cause an apparatus provided with the chip to perform the data transmission method as described above.

According to an embodiment of the present disclosure, a computer-readable storage medium stores a computer program. The computer program causes a computer to perform the data transmission method as described above.

According to an embodiment of the present disclosure, a computer program product includes computer program instructions. The computer program instructions cause a computer to perform the data transmission method as described above.

According to an embodiment of the present disclosure, a computer program, when executed on a computer, causes the computer to perform the data transmission method as described above.

With the above technical solutions, the terminal device transmits, when initiating RRC connection resumption, the first data to the target base station. The target base station transmits, when transmitting the retrieve terminal context request message to the anchor base station, the first data or indication information of the first data (i.e., the first indication information) to the anchor base station for the anchor base station to determine whether the first data may be transmitted to the core network. Here, when the anchor base station is capable of transmitting the first data to the core network, the first data is transmitted by the anchor base station to the core network. When the anchor base station is incapable of transmitting the first data to the core network, the first data is transmitted by the target base station to the core network. In this way, a process of delivering the first data to the core network is clarified. Therefore, the terminal device in an inactive state is capable of delivering, when performing data transmission via a user plane, the first data to the core network via the target base station or the anchor base station.

BRIEF DESCRIPTION OF DRAWINGS

The accompanying drawings described here are used to provide a further understanding of the present disclosure and constitute a part of the present disclosure. Exemplary embodiments of the present disclosure and description thereof are used to explain the present disclosure, and do not constitute an improper limitation of the present disclosure. In the accompanying drawings.

DESCRIPTION OF EMBODIMENTS

Technical solutions according to embodiments of the present disclosure will be described below in combination with accompanying drawings of the embodiments of the present disclosure. Obviously, the embodiments described below are only a part of the embodiments of the present disclosure, rather than all of the embodiments. On a basis of the embodiments in the present disclosure, all other embodiments obtained by a person skilled in the art without creative labor shall fall within the protection scope of the present disclosure.

The technical solutions according to the embodiments of the present disclosure can be applied to various communication systems, such as a Long Term Evolution (LTE) system, an LTE Frequency Division Duplex (FDD) system, an LTE Time Division Duplex (TDD) system, a 5th-Generation (5G) communication system, or a future communication system, etc.

Figure 1:
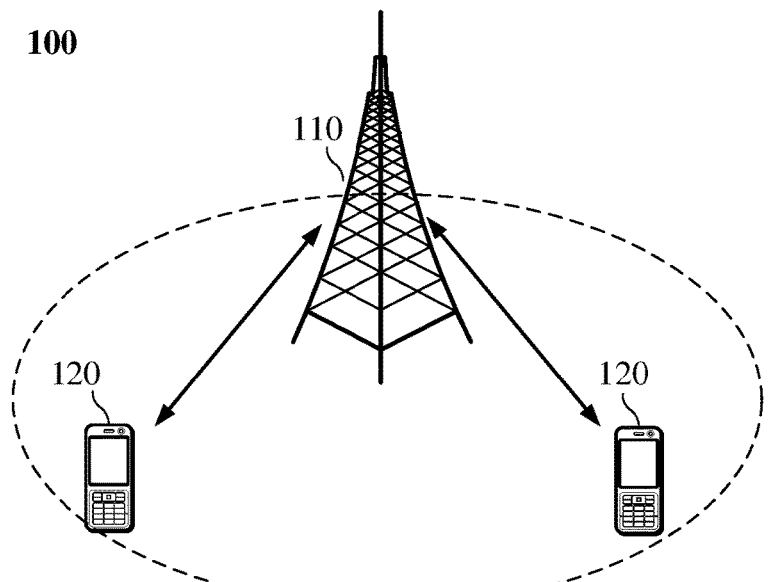
FIG. 1 is a schematic diagram showing a communication system architecture according to an embodiment of the present disclosure.

Exemplarily, a communication system 100 applied in an embodiment of the present disclosure is as illustrated in FIG. 1. The communication system 100 may include a network device 110. The network device 110 may be a device that communicates with a terminal 120. The network device 110 may provide communication coverage for a specific geographic region, and may communicate with a terminal located in the coverage region. Optionally, the network device 110 may be Evolutional Node B (eNB or eNodeB) in an LTE system, or a wireless controller in a Cloud Radio Access Network (CRAN). Alternatively, the network device can be a mobile switching center, a relay station, an access point, a vehicle-mounted device, a wearable device, a hub, a switch, a bridge, a router, a network side device in a 5G network, or a network device in a future communication system, etc.

The communication system 100 further includes at least one terminal 120 located within the coverage region of the network device 110. The terminal 120 is connected to the network device 110 via a wired line connection or via a wireless interface. The terminal 120 connected to the network device 110 through the wireless interface may be referred to as a "wireless communication terminal", a "wireless terminal", or a "mobile terminal". The terminal can refer to an access terminal, a User Equipment (UE), a user unit, a user station, a mobile station, a mobile platform, a remote station, a remote terminal, a mobile device, a user terminal, a terminal, a wireless communication device, a user agent or a user device, a cellular phone, a cordless phone, a Session Initiation Protocol (SIP) phone, a Wireless Local Loop (WLL) station, a Personal Digital Assistant (PDA), a handheld device having a wireless communication function, a computing device or another processing device connected to a wireless modem, a vehicle-mounted device, a wearable device, a terminal in a 5G network, or a terminal in the future evolved PLMN, etc.

Optionally, direct communication, such as Device to Device (D2D) communication, may be performed between the terminals 120.

Optionally, the 5G communication system or the 5G network may also be referred to as a New Radio (NR) system or an NR network.

FIG. 1 exemplarily illustrates one network device and two terminals. Optionally, the communication system 100 may include a plurality of network devices, and coverage of each network device may include a different number of terminals. The embodiments of the present disclosure are not limited to any of these examples.

Optionally, the communication system 100 may also include other network entities such as a network controller and a mobility management entity, and the embodiment of the present disclosure is not limited to any of these examples.

It should be understood that, in the embodiment of the present disclosure, a device having a communication function in a network/system may be referred to as a communication device. Taking the communication system 100 illustrated in FIG. 1 as an example, communication devices may include the network device 110 and the terminals 120, each having a communication function. The network device 110 and the terminal 120 may be any of specific devices described above, and details thereof will be omitted here. The communication device may also include other devices, for example other network entities such as a network controller, a mobility management entity, etc., and embodiments of the present disclosure are not limited to any of these examples.

It should be understood that terms "system" and "network" in the present disclosure are often used interchangeably herein. The term "and/or" in the present disclosure only represents a relationship between correlated objects, including three relationships. For example, "A and/or B" may mean three situations: A only, B only, or both A and B. In addition, the character "/" in the present disclosure generally represents an "or" relationship between the correlated objects preceding and succeeding the symbol.

To facilitate understanding of the technical solutions of the embodiments of the present disclosure, the technical solutions related to the embodiments of the present disclosure will be described below.

With the pursuit of fast speed, low latency, high-speed mobility and high energy efficiency, and given the diversity and complexity of services in future life, the 3rd Generation Partnership Project (3GPP), a global standardization organization, has begun to develop 5G. Main application scenarios of 5G are enhanced Mobile Broadband (eMBB), Ultra-Reliable Low-Latency Communications (URLLC), and massive Machine-Type Communications (mMTC).

For eMBB, on the one hand, it is still targeted at users' access to multimedia content, services, and data, and its demand is growing rapidly. On the other hand, since eMBB may be deployed in different scenarios, such as indoor spaces, urban areas, rural areas, etc., its capabilities and needs vary greatly and thus cannot be treated in the same way and should be analyzed in detail with respect to specific deployment scenarios. Typical applications of URLLC include industrial automation, power automation, telemedicine operation (surgery), traffic safety guarantee, etc. Typical characteristics of mMTC include a high connection density, a small data volume, latency insensitive services, low costs and a long service life of modules, etc.

➢ RRC State

The 5G defines a new RRC state, i.e., an RRC inactive (RRC_INACTIVE) state, for a purpose of reducing air interface signaling and quickly resuming wireless connections and data services. Such state is different from an RRC idle (RRC_IDLE) state and an RRC active (RRC_ACTIVE) state.

1) RRC_IDLE state (referred to as an idle state, for short): Mobility is a UE-based cell selection/reselection. Paging is initiated by a Core Network (CN). A paging area is configured by the CN. No UE context exists on a base station side and no RRC connection exists.

2) RRC_CONNECTED state (referred to as a connected state, for short): RRC connection exists, and a UE context exists on both the base station side and the UE side. A network side knows a position of the UE at a specific cell level. Mobility is controlled by the network side. Unicast data may be transmitted between the UE and the base station.

3) RRC_INACTIVE state (referred to as an inactive state, for short): Mobility is a UE-based cell selection/reselection. A CN-NR connection exists. A UE context exists on some base station. Paging is triggered by an RAN. An RAN-based paging area is managed by the RAN. The network side knows a position of UE at an RAN-based paging area level.

It is possible to transition between the above three RRC states. Here, some RRC parameters on a terminal device side in the inactive state are configured by an RRC release message. Main RRC parameters are described as follows:

An Inactive-Radio Network Temporary Identifier (I-RNTI), which is used to identify an inactive terminal context of the terminal device on the base station side and is unique within the base station.

An RAN Notification Area (RNA), which is an area used for controlling the terminal device to perform a cell selection/reselection in the inactive state and is also a paging range area for RAN-initiated paging.

An RAN paging cycle, which is used to calculate a paging occasion for the RAN-initiated paging.

RNA Update periodicity (RNAU periodicity), which is a cycle used for controlling the terminal device to perform periodic RAN position updates.

A Next hop Chaining Counter (NCC), which is used to determine a secret key used in an RRC connection resume process.

When moving within an RNA area, the terminal device does not need to notify the network side and follows mobility behaviors, i.e., cell selection/reselection principles, in the idle state. When the terminal device moves out of an RAN-configured paging area, the terminal device triggers a procedure for resuming an RRC connection (i.e., an RRC resume procedure) and re-obtains an RAN-configured paging area. When the network side needs to transmit data to the terminal device, i.e., when downlink data arrives, a base station that stores the terminal device context (i.e., a base station that maintains a connection between an access network and a core network for the terminal device) triggers all cells in an RAN paging area to transmit a paging message to the terminal device in such a manner that the terminal device in the inactive state is capable of resuming the RRC connection to receive the downlink data. In addition, the terminal device in the inactive state is configured with the RAN paging area in which, to ensure reachability of the terminal device, the terminal device needs to perform periodic position updates in accordance with a network configuration cycle. Scenarios that trigger the terminal device to perform an RNA update include a scenario where an RNAU timer expires or a scenario where the terminal device moves to an area outside the RNA. Currently, the inactive state defined by the NR does not support the terminal device to transmit user-plane data.

When a target base station to which the terminal device initiates the RRC connection resume procedure is not an anchor base station, the anchor base station determines whether a terminal device context needs to be transferred to the target base station side. Generally, the target base station may transmit a cause value carried in an RRC resume request message initiated by the terminal device to the anchor base station during a procedure for retrieving the terminal device context. The anchor base station determines whether the terminal device context needs to be transferred to the target base station side. For example, the RRC connection resume procedure triggered by periodic RAN position updates generally does not require a context transfer.

Through the RRC connection resume procedure, the terminal device may transmit small data via a user plane. That is, Early Data Transmission (EDT) or small data transmission is achieved. During the RRC connection resume procedure, the terminal device may be always kept in the idle state or a suspended state or the inactive state, and complete uplink data and/or downlink data transmission via the user plane. It should be noted that for such data transmission, the terminal device actually completes the data transmission without entering the connected state. However, in a case of data transmission via the user plane, when the target base station to which the terminal device initiates the RRC connection resume procedure is not the anchor base station, it needs to be clarified how data transmitted by the terminal device is delivered to the core network. To this end, the following technical solutions are provided according to the embodiments of the present disclosure.

Figure 2:
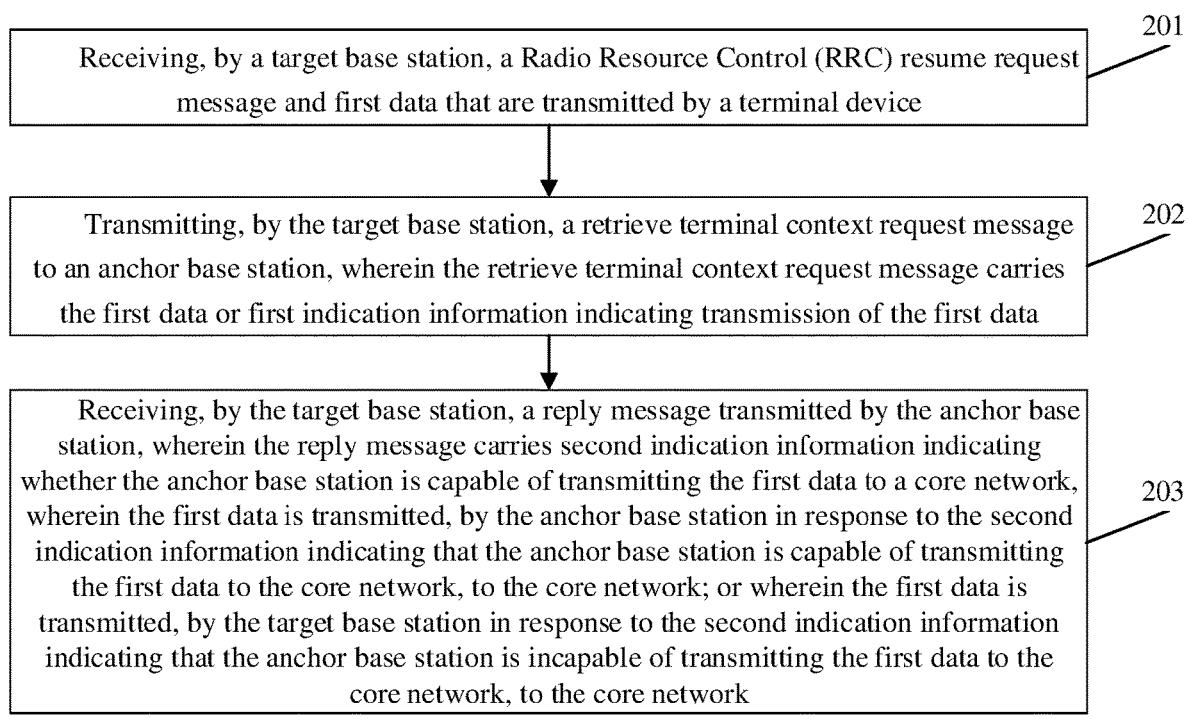
FIG. 2 is a first flowchart illustrating a data transmission method according to an embodiment of the present disclosure.

FIG. 2 is a first flowchart illustrating a data transmission method according to an embodiment of the present disclosure. As illustrated in FIG. 2, the data transmission method includes actions at blocks 201 to 203.

At block 201, a target base station receives an RRC resume request message and first data that are transmitted by a terminal device.

In an embodiment of the present disclosure, the target base station refers to a base station where the terminal device currently resides. The anchor base station refers to a base station where the terminal device context is stored. Optionally, the anchor base station may be a source base station, which refers to the last base station that served the terminal device.

In an optional implementation, the target base station and the anchor base station may be of the same type or different types. For example, both the target base station and the anchor base station are NR base stations (i.e., next generation NB (gNB)). For another example, the target base station is an NR base station (i.e., gNB) and the anchor base station is an LTE base station (i.e., eNB). For yet another example, the target base station is an LTE base station (i.e., eNB) and the anchor base station is an NR base station (i.e., gNB). The embodiment of the present disclosure is not limited to any specific types of the target base station and the anchor base station.

It should be noted that in the embodiments of the present disclosure, the terminal device may also be referred to as UE. The terminal device context (referred to as the terminal context, for short) may also be referred to as a UE context.

In the embodiments of the present disclosure, the terminal device refers to a terminal device in the inactive state, as a non-limiting example. The terminal device may also refer to a terminal device in the idle state or the suspend state. It should be noted that while the following embodiments of the present disclosure are described by taking the inactive state as an example, the technical solutions of the embodiments of the present disclosure is also applicable to the idle state or the suspended state.

In an optional implementation, the terminal device in the inactive state transmits the RRC resume request message and the first data to the target base station when a predetermined condition is met. For example, when a data size of the first data is greater than or equal to a specified threshold, the terminal device in the inactive state transmits the RRC resume request message and the first data to the target base station.

In an optional implementation, the RRC resume request message and the first data are multiplexed and transmitted on a Transport Block (TB). That is, the terminal device multiplexes the RRC resume request message and the first data on the TB and transmits the RRC resume request message and the first data that are multiplexed to the target base station.

In the embodiments of the present disclosure, the first data may be small data, as a non-limiting example. The first data may also be data of other types. It should be noted that the first data is transmitted via the user plane.

At block 202, the target base station transmits a retrieve terminal context request message to an anchor base station. The retrieve terminal context request message carries the first data or first indication information indicating transmission of the first data.

In the embodiments of the present disclosure, the target base station transmits the retrieve terminal context request message (i.e., a retrieve UE context request message) to the anchor base station after receiving the RRC resume request message and the first data that are transmitted by the terminal device. Accordingly, the anchor base station receives the retrieve terminal context request message transmitted by the target base station.

In an optional implementation, the retrieve terminal context request message carries the first data (e.g., the small data).

In another optional implementation, the retrieve terminal context request message carries first indication information indicating transmission of the first data. Taking the first data being the small data as an example, the first indication information may also be referred to as small data indication information.

In yet another optional implementation, the retrieve terminal context request message carries the first data and the first indication information indicating the transmission of the first data.

At block 203, the target base station receives a reply message transmitted by the anchor base station. The reply message carries second indication information indicating whether the anchor base station is capable of transmitting the first data to a core network. Here, the first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

In the embodiments of the present disclosure, the anchor base station determines whether to transfer the terminal context (i.e., the UE context) after receiving the retrieve terminal context request message transmitted by the target base station. Here, optionally, the retrieve terminal context request message carries a cause value indicating a cause that triggers the RRC connection resumption. The anchor base station determines whether to transfer the terminal context based on the cause value. Further, the target base station may obtain the cause value from the received RRC resume request message.

In the embodiments of the present disclosure, depending on whether the anchor base station determines to transfer the terminal context, the reply message transmitted by the anchor base station to the target base station may be different. Description will be made below case by case. It should be noted that the reply message carries the second indication information indicating whether the anchor base station is capable of transmitting the first data to the core network.

Case 1: in the case where the anchor base station determines not to transfer a terminal context, the reply message is a retrieve terminal context failure (retrieve UE context failure) message.

Here, the retrieve terminal context failure message transmitted by the anchor base station to the target base station carries the second indication information indicating whether the anchor base station is capable of transmitting the first data to the core network.

A case where the retrieve terminal context request message carries the first data (corresponding to a technical solution of Example 1 of the present disclosure as described below)

I): The first data is transmitted to the core network by the anchor base station in response to the second indication information indicating that the anchor base station is capable of transmitting the first data to the core network. That is, the anchor base station transmits, after receiving the retrieve terminal context request message, the first data in the retrieve terminal context request message to the core network.

Further, the retrieve terminal context failure message carries an RRC release (RRCRelease) message; and the target base station forwards the RRC release message to the terminal device.

II): In response to the second indication information indicating that the anchor base station is incapable of transmitting the first data to the core network, the target base station sets up an RRC connection with the terminal device and a connection with the core network, receives, via the RRC connection, the first data transmitted by the terminal device, and transmits, via the connection with the core network, the first data to the core network.

Here, the target base station setting up the RRC connection with the terminal device may include: the target base station transmitting an RRC setup (RRCSetup) message to the terminal device; and receiving an RRC setup complete (RRCSetupComplete) message transmitted by the terminal device.

A case where the retrieve terminal context request message carries the first indication information (corresponding to a technical solution of Example 2 of the present disclosure as described below)

I): In response to the second indication information indicating that the anchor base station is capable of transmitting the first data to the core network, the target base station forwards the first data to the anchor base station. Accordingly, the anchor base station receives the first data transmitted by the target base station and transmits the first data to the core network. In this case, the first data is transmitted by the anchor base station to the core network.

Further, the retrieve terminal context failure message carries an RRC release message, and the target base station forwards the RRC release message to the terminal device.

II): In response to the second indication information indicating that the anchor base station is incapable of transmitting the first data to the core network, the target base station sets up an RRC connection with the terminal device and a connection with the core network, receives, via the RRC connection, the first data transmitted by the terminal device, and transmits, via the connection with the core network, the first data to the core network.

Here, the target base station setting up the RRC connection with the terminal device may include: the target base station transmitting an RRC setup message to the terminal device; and receiving an RRC setup complete message transmitted by the terminal device.

Case 2: the reply message is a retrieve terminal context response message (retrieve UE context response) in response to the anchor base station determining to transfer a terminal context.

Here, the retrieve terminal context response message transmitted by the anchor base station to the target base station carries the second indication information indicating whether the anchor base station is capable of transmitting the first data to the core network.

A case where the retrieve terminal context request message carries the first data (corresponding to a technical solution of Example 3 of the present disclosure as described below)

I): The first data is transmitted to the core network by the anchor base station in response to the second indication information indicating that the anchor base station is capable of transmitting the first data to the core network. That is, the anchor base station transmits, after receiving the retrieve terminal context request message, the first data in the retrieve terminal context request message to the core network.

Further, the target base station transmits a path switch request message to the core network, receives a path switch response message transmitted by the core network, and transmits a release terminal context (release UE context) message to the anchor base station and an RRC release message to the terminal device.

II) In response to the second indication information indicating that the anchor base station is incapable of transmitting the first data to the core network, the target base station transmits a path switch request message to the core network, receives a path switch response message transmitted by the core network, and transmits the first data to the core network.

Further, the target base station transmits a release terminal context message to the anchor base station and an RRC release message to the terminal device.

A case where the retrieve terminal context request message carries the first indication information (corresponding to a technical solution of Example 4 of the present disclosure as described below)

I): In response to the second indication information indicating that the anchor base station is capable of transmitting the first data to the core network, the target base station forwards the first data to the anchor base station. Accordingly, the anchor base station receives the first data transmitted by the target base station and transmits the first data to the core network. In this case, the first data is transmitted by the anchor base station to the core network.

Further, the target base station transmits a path switch request message to the core network, receives a path switch response message transmitted by the core network, and transmits a release terminal context message to the anchor base station and an RRC release message to the terminal device.

(II) In response to the second indication information indicating that the anchor base station is incapable of transmitting the first data to the core network, the target base station transmits a path switch request message to the core network, receives a path switch response message transmitted by the core network; and transmits the first data to the core network.

Further, the target base station transmits a release terminal context message to the anchor base station and an RRC release message to the terminal device.

In the above solutions of the present disclosure, the core network includes a core network control plane element and/or a core network user plane element. Here, the core network control plane element is, for example, an Access and Mobility Management Function (AMF) and the core network user plane element is, for example, a User Plane Function (UPF).

The technical solutions of the embodiments of the present disclosure will be exemplified below with specific examples. It should be noted that the following embodiments are described by taking the first data being the small data and the terminal device being the UE as an example.

Example 1

Figure 3:
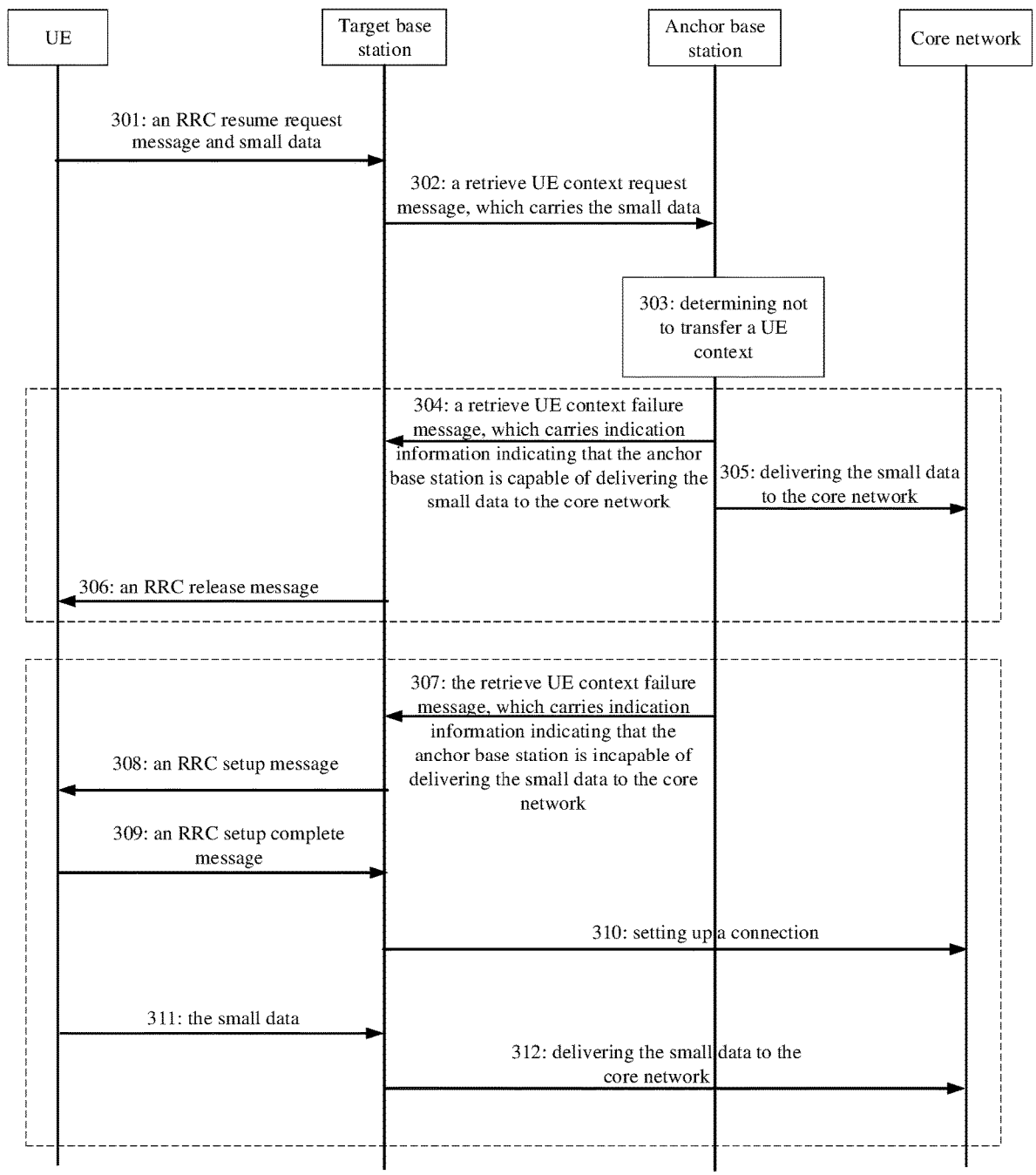
FIG. 3 is a second flowchart illustrating a data transmission method according to an embodiment of the present disclosure.

FIG. 3 is a second flowchart illustrating a data transmission method according to an embodiment of the present disclosure. Referring to FIG. 3, the method includes actions at blocks 301 to 312.

At block 301, a UE transmits an RRC resume request message and small data to a target base station.

Here, the UE in the inactive state transmits the RRC resume request message and the small data to the target base station when a predetermined condition (e.g., a data size of the small data is greater than or equal to a threshold) is met. The RRC resume request message and the small data are multiplexed on a TB and transmitted to the target base station.

At block 302, the target base station transmits a retrieve UE context request message to an anchor base station. The retrieve UE context request message carries the small data.

Here, the target base station transmits the retrieve UE context request message to the anchor base station based on a UE identifier carried in the RRC resume request message.

At block 303, the anchor base station determines not to transfer a UE context. Actions at blocks 304 to 306 are performed, or actions at blocks 307 to 312 are performed.

Here, the anchor base station determines not to transfer a UE context after receiving the retrieve UE context request message.

At block 304, the anchor base station transmits a retrieve UE context failure message to the target base station. The retrieve UE context failure message carries indication information indicating that the anchor base station is capable of delivering the small data to a core network.

Here, the retrieve UE context failure message transmitted by the anchor base station to the target base station contains an RRC release message.

At block 305, the anchor base station delivers the small data to the core network.

At block 306, the target base station transmits the RRC release message to the UE. The method ends.

At block 307, the anchor base station transmits the retrieve UE context failure message to the target base station. The retrieve UE context failure message carries indication information indicating that the anchor base station is incapable of delivering the small data to the core network.

At block 308, the target base station transmits an RRC setup message to the UE.

At block 309, the UE transmits the RRC setup complete message to the target base station.

At block 310, the target base station sets up a connection with the core network.

At block 311, the UE transmits the small data to the target base station.

At block 312, the target base station delivers the small data to the core network. The method ends.

The technical solution of this example specifies how the small data is transmitted between base stations when no UE context is transferred. The target base station directly transmits, via the retrieve UE context request message, the small data to the anchor base station, which can facilitate delivering the small data to the core network by the anchor base station immediately after the UE context is verified, and improve transmission efficiency of the small data.

Example 2

Figure 4:
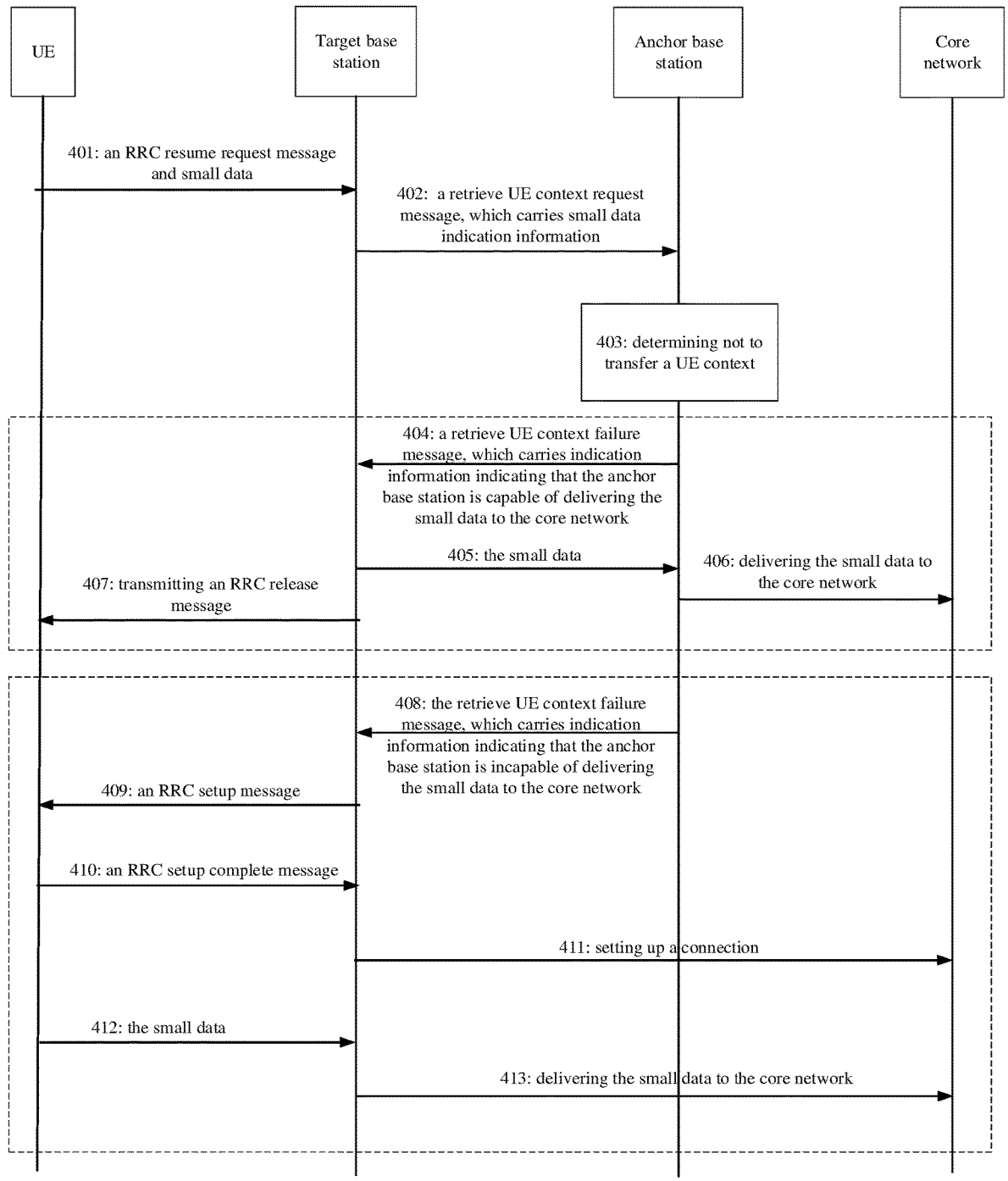
FIG. 4 is a third flowchart illustrating a data transmission method according to an embodiment of the present disclosure.

FIG. 4 is a third flowchart illustrating a data transmission method according to an embodiment of the present disclosure. Referring to FIG. 4, the method includes actions at blocks 401 to 413.

At block 401, a UE transmits an RRC resume request message and small data to a target base station.

Here, the UE in the inactive state transmits the RRC resume request message and the small data to the target base station when a predetermined condition (e.g., a data size of the small data is greater than or equal to a threshold) is met. The RRC resume request message and the small data are multiplexed on a TB and transmitted to the target base station.

At block 402, the target base station transmits a retrieve UE context request message to an anchor base station. The retrieve UE context request message carries small data indication information.

Here, the target base station transmits the retrieve UE context request message to the anchor base station based on a UE identifier carried in the RRC resume request message.

At block 403, the anchor base station determines not to transfer a UE context. Actions at blocks 404 to 407 are performed, or actions at blocks 408 to 413 are performed.

Here, the anchor base station determines not to transfer a UE context after receiving the retrieve UE context request message.

At block 404, the anchor base station transmits a retrieve UE context failure message to the target base station. The retrieve UE context failure message carries the indication information indicating that the anchor base station is capable of delivering the small data to the core network.

Here, the retrieve UE context failure message transmitted by the anchor base station to the target base station contains an RRC release message.

At block 405, the target base station transmits the small data to the anchor base station.

At block 406, the anchor base station delivers the small data to the core network.

At block 407, the target base station transmits the RRC release message to the UE. The method ends.

At block 408, the anchor base station transmits the retrieve UE context failure message to the target base station. The retrieve UE context failure message carries the indication information indicating that the anchor base station is incapable of delivering the small data to the core network.

At block 409, the target base station transmits an RRC setup message to the UE.

At block 410, the UE transmits an RRC setup complete message to the target base station.

At block 411, the target base station sets up a connection with the core network.

At block 412, the UE transmits the small data to the target base station.

At block 413, the target base station delivers the small data to the core network. The method ends.

The technical solution of this example specifies how the small data is transmitted between base stations when no UE context is transferred. The target base station transmits, via the retrieve UE context request message, the small data indication information to the anchor base station, which can facilitate avoiding unnecessary X2 interface transmission when the anchor base station is incapable of verifying the UE context. Transmitting the small data to the anchor base station only when the target base station determines that the anchor base station is capable of delivering the small data can save load overhead on the X2 interface.

Example 3

Figure 5:
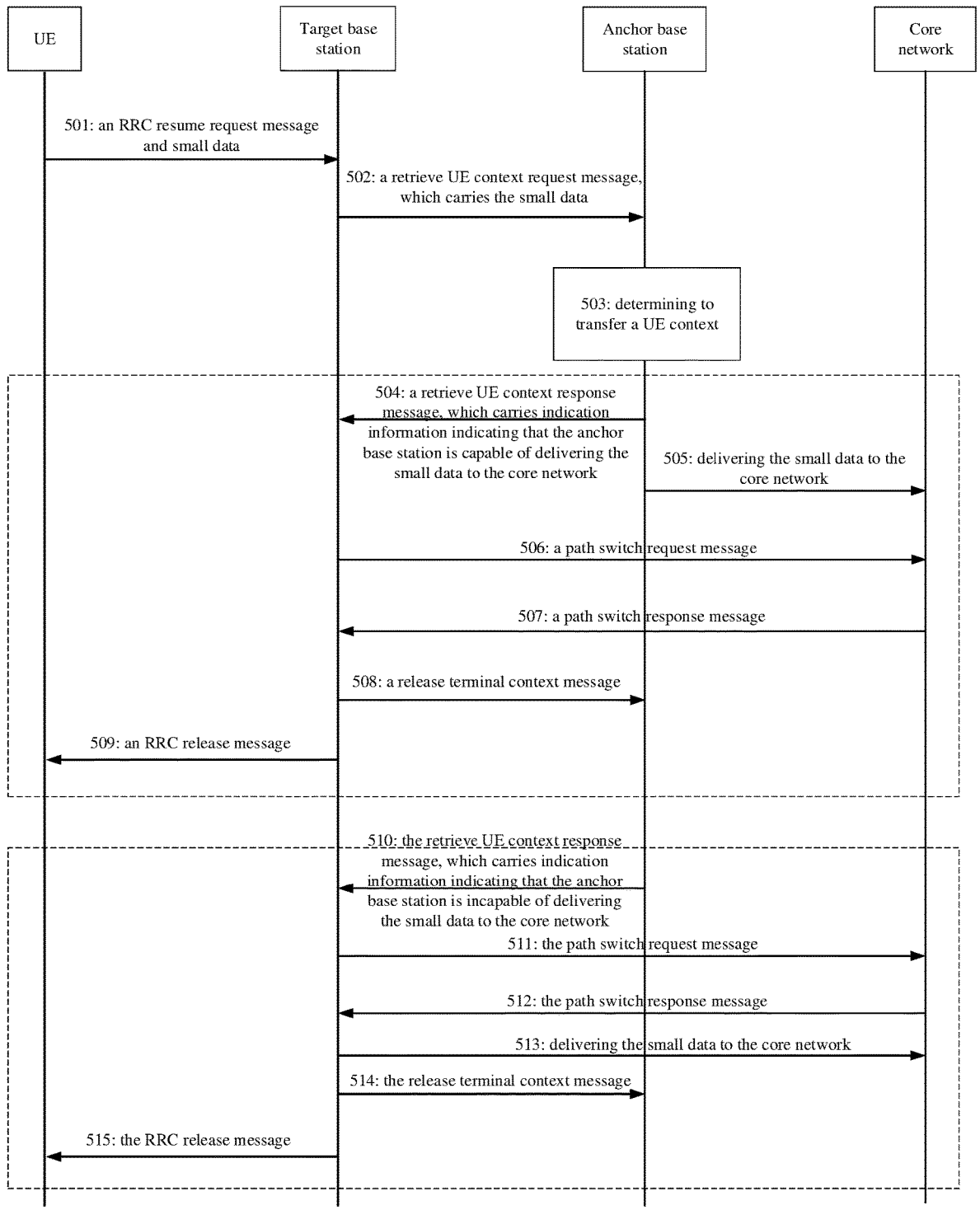
FIG. 5 is a fourth flowchart illustrating a data transmission method according to an embodiment of the present disclosure.

FIG. 5 is a fourth flowchart illustrating a data transmission method according to an embodiment of the present disclosure. Referring to FIG. 5, the method includes actions at blocks 501 to 515.

At block 501, a UE transmits an RRC resume request message and small data to a target base station.

Here, the UE in the inactive state transmits the RRC resume request message and the small data to the target base station when a predetermined condition (e.g., a data size of the small data is greater than or equal to a threshold) is met. The RRC resume request message and the small data are multiplexed on a TB and transmitted to the target base station.

At block 502, the target base station transmits a retrieve UE context request message to an anchor base station. The retrieve UE context request message carries the small data.

Here, the target base station transmits the retrieve UE context request message to the anchor base station based on a UE identifier carried in the RRC resume request message.

At block 503, the anchor base station determines to transfer the UE context. Actions at blocks 504 to 509 are performed, or actions at blocks 510 to 515 are performed.

Here, the anchor base station determines to transfer the UE context after receiving the retrieve UE context request message.

At block 504, the anchor base station transmits a retrieve UE context response message to the target base station. The retrieve UE context response message carries indication information indicating that the anchor base station is capable of delivering the small data to the core network.

At block 505, the anchor base station delivers the small data to the core network.

At block 506, the target base station transmits the path switch request message to the core network.

At block 507, the core network transmits the path switch response message to the target base station.

At block 508, the target base station transmits the release terminal context message to the anchor base station.

At block 509, the target base station transmits an RRC release message to the UE. The method ends.

At block 510, the anchor base station transmits a retrieve UE context response message to the target base station. The retrieve UE context response message carries indication information indicating that the anchor base station is incapable of delivering the small data to the core network.

At block 511, the target base station transmits a path switch request message to the core network.

At block 512, the core network transmits a path switch response message to the target base station.

At block 513, the target base station delivers the small data to the core network.

At block 514, the target base station transmits a release terminal context message to the anchor base station.

At block 515, the target base station transmits an RRC release message to the UE. The method ends.

The technical solution of this example specifies how the small data is transmitted between base stations when the UE context is transferred. The target base station directly transmits, via the retrieve UE context request message, the small data to the anchor base station, which can facilitate delivering the small data to the core network by the anchor base station immediately after the UE context is verified, and improve transmission efficiency of the small data.

Example 4

Figure 6:
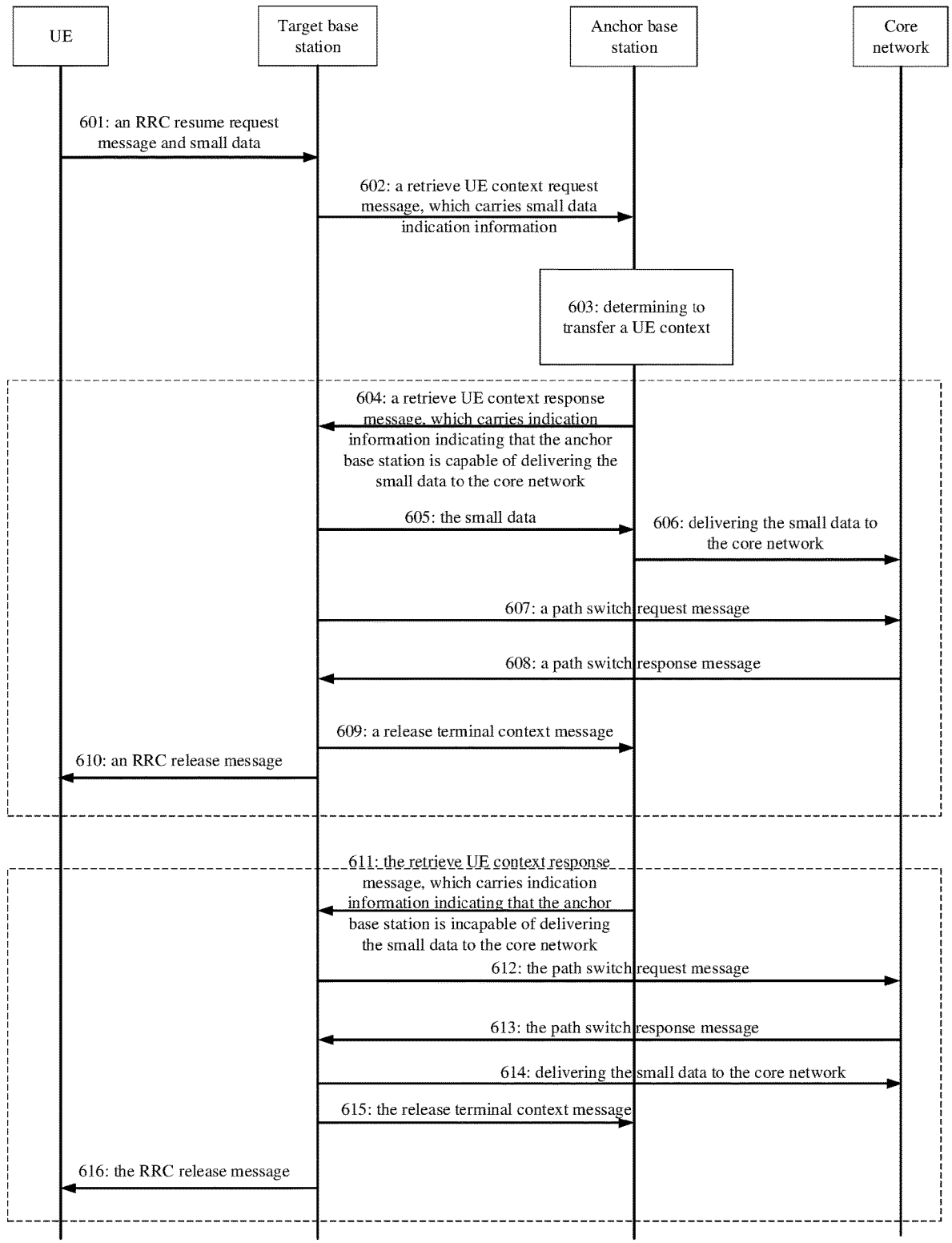
FIG. 6 is a fifth flowchart illustrating a data transmission method according to an embodiment of the present disclosure.

FIG. 6 is a fifth flowchart illustrating a data transmission method according to an embodiment of the present disclosure. Referring to FIG. 6, the method includes actions at blocks 601 to 616.

At block 601, a UE transmits an RRC resume request message and small data to a target base station.

Here, the UE in the inactive state transmits the RRC resume request message and the small data to the target base station when a predetermined condition (e.g., a data size of the small data is greater than or equal to a threshold) is met. The RRC resume request message and the small data are multiplexed on a TB and transmitted to the target base station.

At block 602, the target base station transmits a retrieve UE context request message to an anchor base station. The retrieve UE context request message carries small data indication information.

Here, the target base station transmits the retrieve UE context request message to the anchor base station based on a UE identifier carried in the RRC resume request message.

At block 603, the anchor base station determines to transfer the UE context. Actions at blocks 604 to 610 are performed, or actions at blocks 611 to 616 are performed.

Here, the anchor base station determines to transfer the UE context after receiving the retrieve UE context request message.

At block 604, the anchor base station transmits a retrieve UE context response message to the target base station. The retrieve UE context response message carries indication information indicating that the anchor base station is capable of delivering the small data to the core network.

At block 605, the target base station transmits the small data to the anchor base station.

At block 606, the anchor base station delivers the small data to the core network.

At block 607, the target base station transmits a path switch request message to the core network.

At block 608, the core network transmits a path switch response message to the target base station.

At block 609, the target base station transmits a release terminal context message to the anchor base station.

At block 610, the target base station transmits an RRC release message to the UE. The method ends.

At block 611, the anchor base station transmits the retrieve UE context response message to the target base station. The retrieve UE context response message carries the indication information indicating that the anchor base station is incapable of delivering the small data to the core network.

At block 612, the target base station transmits a path switch request message to the core network.

At block 613, the core network transmits a path switch response message to the target base station.

At block 614, the target base station delivers the small data to the core network.

At block 615, the target base station transmits a release terminal context message to the anchor base station.

At block 616, the target base station transmits an RRC release message to the UE. The method ends.

The technical solution of this example specifies how the small data is transmitted between base stations when the UE context is transferred. The target base station transmits, via the retrieve UE context request message, the small data indication information to the anchor base station, which can facilitate avoiding unnecessary X2 interface transmission when the anchor base station is incapable of verifying the UE context. Transmitting the small data to the anchor base station only when the target base station determines that the anchor base station is capable of delivering the small data can save the load overhead on the X2 interface.

Figure 7:
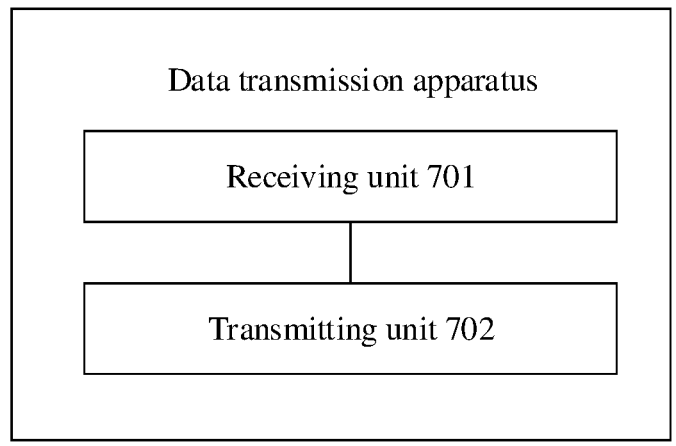
FIG. 7 is a first schematic block diagram showing a structure of a data transmission apparatus according to an embodiment of the present disclosure.

FIG. 7 is a first schematic block diagram showing a structure of a data transmission apparatus according to an embodiment of the present disclosure. The data transmission apparatus is applied in the target base station. As illustrated in FIG. 7, the data transmission apparatus includes a receiving unit 701 and a transmitting unit 702.

The receiving unit 701 is configured to receive an RRC resume request message and first data that are transmitted by a terminal device. The transmitting unit 702 is configured to transmit a retrieve terminal context request message to an anchor base station. The retrieve terminal context request message carries the first data or first indication information indicating transmission of the first data. The receiving unit 701 is further configured to receive a reply message transmitted by the anchor base station. The reply message carries second indication information indicating whether the anchor base station is capable of transmitting the first data to a core network. Here, the first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

In an optional implementation, the reply message is a retrieve terminal context failure message in response to the anchor base station determining not to transfer a terminal context.

In an optional implementation, the retrieve terminal context request message carries the first data. The first data is transmitted to the core network by the anchor base station in response to the second indication information indicating that the anchor base station is capable of transmitting the first data to the core network.

In an optional implementation, the retrieve terminal context request message carries the first indication information. The transmitting unit 702 is further configured to forward, in response to the second indication information indicating that the anchor base station is capable of transmitting the first data to the core network, the first data to the anchor base station. The first data is transmitted by the anchor base station to the core network.

In an optional implementation, the retrieve terminal context failure message carries an RRC release message. The transmitting unit 702 is further configured to forward the RRC release message to the terminal device.

In an optional implementation, in response to the second indication information indicating that the anchor base station is incapable of transmitting the first data to the core network, the apparatus further includes a setup unit (not illustrated) configured to set up an RRC connection with the terminal device and a connection with the core network. The receiving unit 701 is further configured to receive, via the RRC connection, the first data transmitted by the terminal device. The transmitting unit 702 is further configured to transmit, via the connection between the target base station and the core network, the first data to the core network.

In an optional implementation, the setup unit is configured to transmit an RRC setup message to the terminal device; and receive an RRC setup complete message transmitted by the terminal device.

In an optional implementation, the reply message is a retrieve terminal context response message in response to the anchor base station determining to transfer a terminal context.

In an optional implementation, the retrieve terminal context request message carries the first data. The first data is transmitted to the core network by the anchor base station in response to the second indication information indicating that the anchor base station is capable of transmitting the first data to the core network. The transmitting unit 702 is further configured to transmit a path switch request message to the core network. The receiving unit 701 is further configured to receive a path switch response message transmitted by the core network. The transmitting unit 702 is further configured to transmit a release terminal context message to the anchor base station and an RRC release message to the terminal device.

In an optional implementation, the retrieve terminal context request message carries the first indication information. In response to the second indication information indicating that the anchor base station is capable of transmitting the first data to the core network, the transmitting unit 702 is further configured to forward the first data to the anchor base station, and the first data is transmitted by the anchor base station to the core network; the transmitting unit 702 is further configured to transmit a path switch request message to the core network; the receiving unit 701 is further configured to receive a path switch response message transmitted by the core network; and the transmitting unit 702 is further configured to transmit a release terminal context message to the anchor base station and an RRC release message to the terminal device.

In an optional implementation, in response to the second indication information indicating that the anchor base station is incapable of transmitting the first data to the core network, the transmitting unit 702 is further configured to transmit a path switch request message to the core network; the receiving unit 701 is further configured to receive a path switch response message transmitted by the core network; the transmitting unit 702 is further configured to transmit the first data to the core network; and the transmitting unit 702 is further configured to transmit a release terminal context message to the anchor base station and an RRC release message to the terminal device.

In an optional implementation, the RRC resume request message and the first data are multiplexed and transmitted on a TB.

In an optional implementation, the first data is small data.

It should be understood by those skilled in the art that relevant description of the data transmission apparatus according to the embodiments of the present disclosure can be understood with reference to relevant description of the data transmission method according to the embodiments of the present disclosure.

Figure 8:
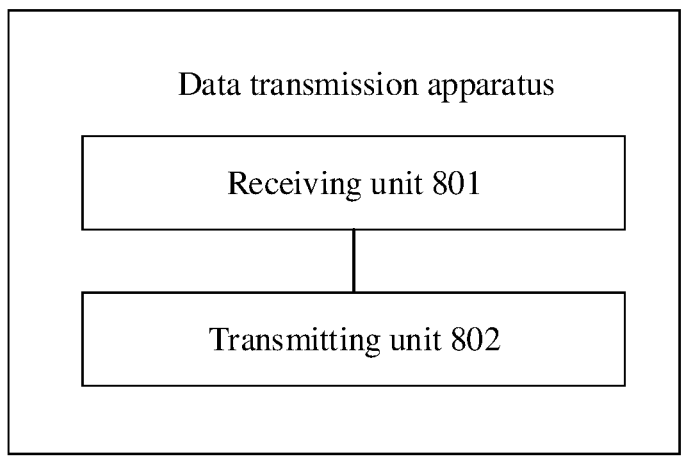
FIG. 8 is a second schematic block diagram showing a structure of a data transmission apparatus according to an embodiment of the present disclosure.

FIG. 8 is a second schematic block diagram showing a structure of a data transmission apparatus according to an embodiment of the present disclosure. The data transmission apparatus is applied in an anchor base station. As illustrated in FIG. 8, the data transmission apparatus includes a receiving unit 801 and a transmitting unit 802.

The receiving unit 801 is configured to receive a retrieve terminal context request message transmitted by a target base station. The retrieve terminal context request message carries first data or first indication information indicating transmission of the first data. The transmitting unit 802 is configured to transmit a reply message to the target base station. The reply message carries second indication information indicating whether the anchor base station is capable of transmitting the first data to a core network. Here, the first data is transmitted to the core network by the anchor base station in response to the second indication information indicating that the anchor base station is capable of transmitting the first data to the core network; or the first data is transmitted to the core network by the target base station in response to the second indication information indicating that the anchor base station is incapable of transmitting the first data to the core network.

In an optional implementation, the reply message is a retrieve terminal context failure message in response to the anchor base station determining not to transfer a terminal context.

In an optional implementation, the reply message is a retrieve terminal context response message in response to the anchor base station determining to transfer a terminal context.

In an optional implementation, the retrieve terminal context request message carries the first data. The transmitting unit 802 is further configured to transmit, in response to the second indication information indicating that the anchor base station is capable of transmitting the first data to the core network, the first data to the core network.

In an optional implementation, the retrieve terminal context request message carries the first indication information. In response to the second indication information indicating that the anchor base station is capable of transmitting the first data to the core network, the receiving unit 801 is further configured to receive the first data transmitted by the target base station; and the transmitting unit 802 is further configured to transmit the first data to the core network.

In an optional implementation, the first data is small data.

It should be understood by those skilled in the art that relevant description of the data transmission apparatus according to the embodiments of the present disclosure can be understood with reference to relevant description of the data transmission method according to the embodiments of the present disclosure.

Figure 9:
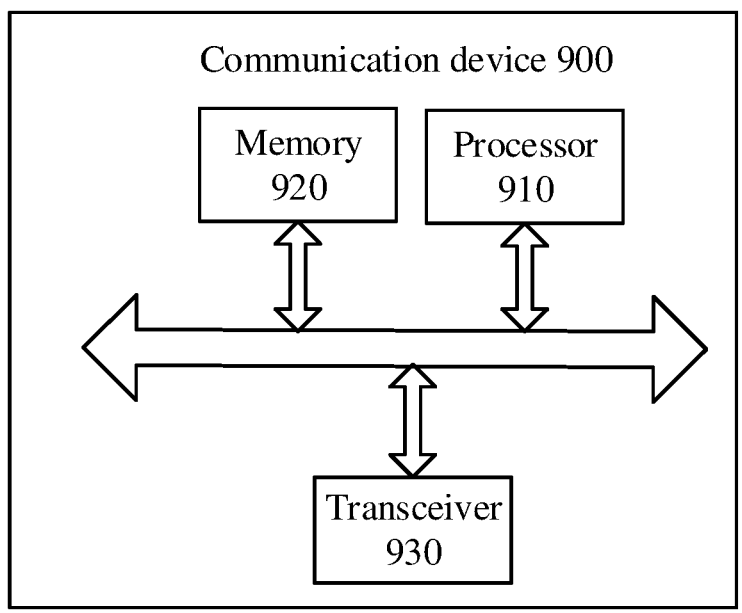
FIG. 9 is a schematic structural block diagram showing a communication device according to an embodiment of the present disclosure.

FIG. 9 is a schematic structural block diagram showing a communication device 900 according to an embodiment of the present disclosure. The communication device may be a terminal device or a network device (e.g., the target base station or the anchor base station). The communication device 900 illustrated in FIG. 9 includes a processor 910. The processor 910 is configured to invoke and run a computer program from a memory to perform the method according to any of the embodiments of the present disclosure.

Optionally, as illustrated in FIG. 9, the communication device 900 may further include a memory 920. The processor 910 may invoke and run a computer program from the memory 920 to perform the method according to any of the embodiments of the present disclosure.

Here, the memory 920 may be a separate component independent of the processor 910, or may be integrated in the processor 910.

Optionally, as illustrated in FIG. 9, the communication device 900 may further include a transceiver 930. The processor 910 may control the transceiver 930 to communicate with other devices, specifically, to transmit information or data to other devices, or receive information or data transmitted by other devices.

Here, the transceiver 930 may include a transmitter and a receiver. The transceiver 930 may further include one or more antennas.

Optionally, the communication device 900 may specifically be a network device according to an embodiment of the present disclosure. The communication device 900 may execute corresponding processes implemented by the network device in the method according to any of the embodiments of the present disclosure. For brevity, details thereof will be omitted herein.

Optionally, the communication device 900 may specifically be the mobile terminal/terminal device according to any of the embodiments of the present disclosure. The communication device 900 may implement corresponding processes implemented by the mobile terminal/terminal device in the method according to any of the embodiments of the present disclosure. For brevity, details thereof will be omitted herein.

Figure 10:
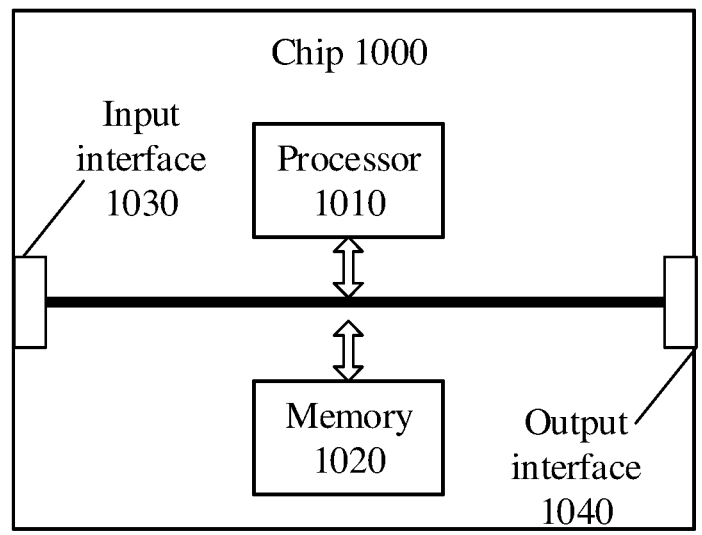
FIG. 10 is a schematic structural block diagram showing a chip according to an embodiment of the present disclosure.

FIG. 10 is a schematic diagram showing a structure of a chip according to an embodiment of the present disclosure. A chip 1000 illustrated in FIG. 10 includes a processor 1010. The processor 1010 can invoke and run a computer program from the memory to perform the method according to any of the embodiments of the present disclosure.

Optionally, as illustrated in FIG. 10, the chip 1000 may further include a memory 1020. The processor 1010 may invoke and run a computer program from the memory 1020 to perform the method according to any of the embodiments of the present disclosure.

Here, the memory 1020 may be a separate component independent of the processor 1010, or may be integrated in the processor 1010.

Optionally, the chip 1000 may further include an input interface 1030. The processor 1010 can control the input interface 1030 to communicate with other devices or chips, specifically, to obtain information or data transmitted by other devices or chips.

Optionally, the chip 1000 may further include an output interface 1040. The processor 1010 can control the output interface 1040 to communicate with other devices or chips, specifically, to output information or data to other devices or chips.

Optionally, the chip can be applied to the network device according to any of the embodiments of the present disclosure. In addition, the chip can implement corresponding processes implemented by the network device in the method according to any of the embodiments of the present disclosure. For brevity, details thereof will be omitted herein.

Optionally, the chip can be applied to the mobile terminal/terminal device according to any of the embodiments of the present disclosure. The chip can implement corresponding processes implemented by the mobile terminal/terminal device in the method according to any of the embodiments of the present disclosure. For brevity, details thereof will be omitted herein.

It should be understood that the chip mentioned in the embodiments of the present disclosure may also be referred to as a system-level chip, a system-chip, a chip system, or a system-on-chip.

Figure 11:
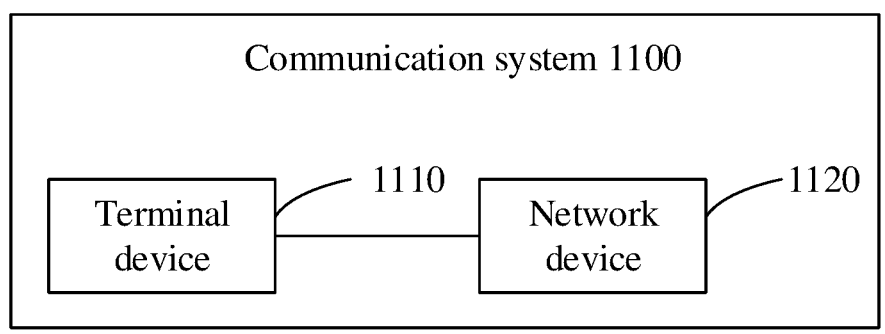
FIG. 11 is a schematic block diagram showing a communication system according to an embodiment of the present disclosure.

FIG. 11 is a schematic block diagram showing a communication system 1100 according to an embodiment of the present disclosure. As illustrated in FIG. 11, the communication system 1100 includes a terminal device 1110 and a network device 1120.

Here, the terminal device 1110 can be configured to implement the corresponding functions implemented by the terminal device in the above methods. The network device 1120 can be configured to implement corresponding functions implemented by the network device in the above methods. For brevity, details thereof will be omitted herein.

It is to be noted that the processor in the embodiment of the present disclosure may be an integrated circuit chip with signal processing capability. In an implementation, the steps of the above method embodiments can be implemented by hardware integrated logic circuits in a processor or instructions in the form of software. The processor can be a general purpose processor, a Digital Signal Processor (DSP), an Application Specific Integrated Circuit (ASIC), a Field Programmable Gate Array (FPGA) or another programmable logic device, a discrete gate or transistor logic device, or a discrete hardware component. The methods, steps, and logical block diagrams disclosed in the embodiments of the present disclosure can be implemented or performed. The general purpose processor may be a microprocessor or any conventional processor. The steps of the methods disclosed in the embodiments of the present disclosure may be directly embodied as being performed and completed by a hardware decoding processor, or by a combination of hardware and software modules in the decoding processor. The software modules can be located in a known storage medium in the related art, such as random access memory, flash memory, read-only memory, programmable read-only memory, electrically erasable programmable memory, or register. The storage medium can be located in the memory, and the processor can read information from the memory and perform the steps of the above methods in combination with its hardware.

It can be appreciated that the memory in the embodiments of the present disclosure may be a transitory memory or a non-transitory memory, or may include both transitory and non-transitory memories. Here, the non-transitory memory may be a Read-Only Memory (ROM), a Programmable ROM (PROM), an Erasable PROM (EPROM), an Electrically EPROM (EEPROM), or a flash memory. The transitory memory may be a Random Access Memory (RAM), which is used as an external cache. As illustrative, rather than limiting, many forms of RAMs are available, including for example Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM)), and Direct Rambus RAM (DR RAM). It is to be noted that the memory used for the system and method described in the present disclosure is intended to include, but not limited to, these and any other suitable types of memories.

It can be appreciated that the above memories are exemplary only, rather than limiting the present disclosure. For example, the memory in the embodiment of the present disclosure may also be a Static RAM (SRAM), a Dynamic RAM (DRAM), a Synchronous DRAM (SDRAM), a Double Data Rate SDRAM (DDR SDRAM), an Enhanced SDRAM (ESDRAM), a Synch Link DRAM (SLDRAM), or a Direct Rambus RAM (DR RAM). That is, the memory in the embodiments of the present disclosure is intended to include, but not limited to, these and any other suitable types of memories.

An embodiment of the present disclosure also provides a computer-readable storage medium for storing a computer program.

Optionally, the computer-readable storage medium can be applied to the network device in the embodiment of the present disclosure, and the computer program can cause a computer to perform corresponding procedures implemented by the network device in the method according to any of the embodiments of the present disclosure. Details thereof will be omitted here for simplicity.

Optionally, the computer-readable storage medium can be applied to the mobile terminal/terminal device in the embodiment of the present disclosure, and the computer program can cause a computer to perform corresponding procedures implemented by the mobile terminal/terminal device in the method according to any of the embodiments of the present disclosure. Details thereof will be omitted here for simplicity.

An embodiment of the present disclosure also provides a computer program product including computer program instructions.

Optionally, the computer program product can be applied to the network device in the embodiment of the present disclosure, and the computer program instructions can cause a computer to perform corresponding procedures implemented by the network device in the method according to any of the embodiments of the present disclosure. Details thereof will be omitted here for simplicity.

Optionally, the computer program product can be applied to the mobile terminal/terminal device in the embodiment of the present disclosure, and the computer program instructions can cause a computer to perform corresponding procedures implemented by the mobile terminal/terminal device in the method according to any of the embodiments of the present disclosure. Details thereof will be omitted here for simplicity.

An embodiment of the present disclosure also provides a computer program.

Optionally, the computer program can be applied to the network device in the embodiment of the present disclosure. The computer program, when executed on a computer, can cause the computer to perform corresponding procedures implemented by the network device in the method according to any of the embodiments of the present disclosure. Details thereof will be omitted here for simplicity.

Optionally, the computer program can be applied to the mobile terminal/terminal device in the embodiment of the present disclosure. The computer program, when executed on a computer, can cause the computer to perform corresponding procedures implemented by the mobile terminal/terminal device in the method according to any of the embodiments of the present disclosure. Details thereof will be omitted here for simplicity.

It can be appreciated by those skilled in the art that units and algorithm steps in the examples described in connection with the embodiments disclosed herein can be implemented in electronic hardware or any combination of computer software and electronic hardware. Whether these functions are executed by hardware or software depends on specific applications and design constraint conditions of the technical solutions. Those skilled in the art may use different methods for each specific application to implement the described functions, and such implementation is to be encompassed by the scope of this disclosure.

Those skilled in the art can clearly understand that, for the convenience and conciseness of the description, for the specific operation processes of the systems, devices, and units described above, reference can be made to the corresponding processes in the foregoing method embodiments, and details thereof will be omitted here.

In the embodiments of the present disclosure, it can be appreciated that the disclosed systems, devices, and methods may be implemented in other ways. For example, the device embodiments described above are illustrative only. For example, the divisions of the units are only divisions based on logical functions, and there may be other divisions in actual implementations. For example, more than one unit or component may be combined or integrated into another system, or some features can be ignored or omitted. In addition, the mutual coupling or direct coupling or communicative connection as shown or discussed may be indirect coupling or communicative connection between devices or units via some interfaces which may be electrical, mechanical, or in any other forms.

The units described as separate components may or may not be physically separated, and the components shown as units may or may not be physical units, that is, they may be co-located or distributed across a number of network elements. Some or all of the units may be selected according to actual needs to achieve the objects of the solutions of the embodiments.

In addition, the functional units in the embodiments of the present disclosure may be integrated into one processing unit, or alternatively be separate physical modules, or two or more units may be integrated into one unit.

When the function is implemented in the form of a software functional unit and sold or used as a standalone product, it can be stored in a computer-readable storage medium. Based on this understanding, all or part of the technical solutions according to the present disclosure, or the part thereof that contributes to the prior art, can be embodied in the form of a software product. The computer software product may be stored in a storage medium and contain instructions to enable a computer device, such as a personal computer, a server, or a network device, etc., to perform all or part of the steps of the method described in each of the embodiments of the present disclosure. The storage medium may include various mediums capable of storing program codes, such as a Universal Serial Bus flash drive, a mobile hard disk, an ROM, an RAM, a magnetic disk, or an optical disc.

While the specific embodiments of the present disclosure have been described above, the protect scope of the present disclosure is not limited to these embodiments. Various variants and alternatives can be easily conceived by any of those skilled in the art without departing from the technical scope of the present disclosure. Therefore, these variants and alternatives are to be encompassed by the protect scope of present disclosure as defined by the claims as attached.

What is claimed is:

1. A data transmission method, comprising:
   receiving, by a target base station, a Radio Resource Control (RRC) resume request message and first data that are transmitted by a terminal device;
   transmitting, by the target base station, a retrieve terminal context request message to an anchor base station, wherein the retrieve terminal context request message carries the first data or first indication information indicating transmission of the first data; and
   receiving, by the target base station, a reply message transmitted by the anchor base station, wherein the reply message carries second indication information, the second indication information indicating the anchor base station is capable of transmitting the first data to a core network or the second indication information indicating the anchor base station is incapable of transmitting the first data to the core network,
   wherein the first data is transmitted to the core network by the anchor base station in response to the second indication information indicating that the anchor base station is capable of transmitting the first data to the core network; or wherein the first data is transmitted to the core network by the target base station in response to the second indication information indicating that the anchor base station is incapable of transmitting the first data to the core network,
   wherein the reply message is a retrieve terminal context response message in response to the anchor base station determining to transfer a terminal context,
   wherein the method further comprises, in response to the second indication information indicating that the anchor base station is incapable of transmitting the first data to the core network;
   transmitting, by the target base station, a path switch request message to the core network, and receiving, by the target base station, a path switch response message transmitted by the core network;
   transmitting, by the target base station, the first data to the core network; and
   transmitting, by the target base station, a release terminal context message to the anchor base station and an RRC release message to the terminal device.

2. The method according to claim 1, wherein the method further comprises, in response to the second indication information indicating that the anchor base station is capable of transmitting the first data to the core network:
   forwarding, by the target base station, the first data to the anchor base station, wherein the first data is transmitted by the anchor base station to the core network.

3. The method according to claim 1, wherein the first data is small data.

4. A chip, comprising a processor configured to invoke and execute a computer program from a memory to cause an apparatus provided with the chip to perform the method according to claim 1.

5. A communication device, comprising:
   a processor; and
   a memory for storing a computer program,
   wherein the processor is configured to invoke and execute the computer program stored in the memory to cause the communication device to:
   receive a Radio Resource Control (RRC) resume request message and first data that are transmitted by a terminal device;
   transmit a retrieve terminal context request message to an anchor base station, wherein the retrieve terminal context request message carries the first data or first indication information indicating transmission of the first data; and receive a reply message transmitted by the anchor base station, wherein the reply message carries second indication information, the second indication information indicating the anchor base station is capable of transmitting the first data to a core network or the second indication information indicating the anchor base station is incapable of transmitting the first data to the core network, wherein the first data is transmitted to the core network by the anchor base station in response to the second indication information indicating that the anchor base station is capable of transmitting the first data to the core network; or wherein the first data is transmitted to the core network by the communication device in response to the second indication information indicating that the anchor base station is incapable of transmitting the first data to the core network, wherein the reply message is a retrieve terminal context response message in response to the anchor base station determining to transfer a terminal context, wherein the processor is further configured to invoke and execute the computer program stored in the memory to cause the communication device to, in response to the second indication information indicating that the anchor base station is incapable of transmitting the first data to the core network;

transmit a path switch request message to the core network, and receiving a path switch response message transmitted by the core network;

transmit the first data to the core network; and transmit a release terminal context message to the anchor base station and an RRC release message to the terminal device.

6. The communication device according to claim 5, wherein the processor is further configured to invoke and execute the computer program stored in the memory to cause the communication device to, in response to the second indication information indicating that the anchor base station is capable of transmitting the first data to the core network:

forward the first data to the anchor base station, wherein the first data is transmitted by the anchor base station to the core network.

7. The communication device according to claim 5, wherein the first data is small data.

* * * * *